United States Patent
Bothe et al.

(10) Patent No.: US 12,206,560 B2
(45) Date of Patent: *Jan. 21, 2025

(54) AUTOMATIC AND DYNAMIC PERFORMANCE BENCHMARKING AND SCORING OF APPLICATIONS BASED ON CROWDSOURCED TRAFFIC DATA

(71) Applicant: Palo Alto Networks, Inc., Santa Clara, CA (US)

(72) Inventors: John Bothe, Mount Eliza (AU); Hristos Siakou, Ivanhoe East (AU); Con Nikolouzakis, Doncaster (AU)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,789

(22) Filed: Aug. 10, 2023

(65) Prior Publication Data
US 2023/0388203 A1 Nov. 30, 2023

Related U.S. Application Data

(63) Continuation of application No. 16/840,151, filed on Apr. 3, 2020, now Pat. No. 11,770,311.
(Continued)

(51) Int. Cl.
| | | |
|---|---|---|
| *H04L 12/00* | (2006.01) | |
| *H04L 43/022* | (2022.01) | |
| *H04L 43/04* | (2022.01) | |
| *H04L 43/062* | (2022.01) | |
| *H04L 43/0876* | (2022.01) | |
| *H04L 43/12* | (2022.01) | |
| *H04L 43/16* | (2022.01) | |

(52) U.S. Cl.
CPC ............ *H04L 43/022* (2013.01); *H04L 43/04* (2013.01); *H04L 43/062* (2013.01); *H04L 43/0876* (2013.01); *H04L 43/12* (2013.01); *H04L 43/16* (2013.01)

(58) Field of Classification Search
CPC ..... H04L 43/022; H04L 43/04; H04L 43/062; H04L 43/0876; H04L 43/12; H04L 43/16; H04L 41/5067
USPC .......................................................... 709/224
See application file for complete search history.

(56) References Cited

U.S. PATENT DOCUMENTS

| | | |
|---|---|---|
| 5,245,498 A | 9/1993 | Uchida et al. |
| 5,819,066 A | 10/1998 | Bromberg et al. |
| (Continued) | | |

*Primary Examiner* — Frantz Coby
(74) *Attorney, Agent, or Firm* — Gilliam IP PLLC

(57) ABSTRACT

The disclosure describes various aspects of crowdsourcing traffic data for automatic and dynamic benchmarking of applications. In an aspect, an intelligence layer, communicatively coupled to a data collection layer and a visualization layer, is configured to receive traffic data from data sources (e.g., physical appliances, probes) in the data collection layer, the data sources being associated with multiple customers, and the traffic data being associated with at least one application (e.g., word processing, video streaming) used by the multiple customers. The intelligence layer is a cloud-based layer further configured to process the traffic data to determine performance thresholds for the at least one application, and may send one or more of the performance thresholds to a data source for a different customer to be used for benchmarking the at least one application for the different customer.

20 Claims, 6 Drawing Sheets

Related U.S. Application Data

(60) Provisional application No. 62/829,861, filed on Apr. 5, 2019.

(56) References Cited

U.S. PATENT DOCUMENTS

| | | | |
|---|---|---|---|
| 6,754,612 B1 | 6/2004 | Vanfladern et al. | |
| 8,332,263 B2 | 12/2012 | Ramesh et al. | |
| 8,335,661 B1 | 12/2012 | Satish | |
| 8,626,545 B2 | 1/2014 | Van Pelt et al. | |
| 8,718,910 B2 | 5/2014 | Guéziec | |
| 8,745,617 B1 | 6/2014 | Stekkelpak et al. | |
| 8,930,123 B2 | 1/2015 | Srivastava | |
| 9,047,774 B2 | 6/2015 | Tseng et al. | |
| 9,124,498 B2 | 9/2015 | Jung et al. | |
| 9,240,082 B2 | 1/2016 | Marathe et al. | |
| 9,508,202 B2 | 11/2016 | Marathe et al. | |
| 9,762,461 B2 | 9/2017 | Raghunathan et al. | |
| 9,967,278 B2 | 5/2018 | Jevans et al. | |
| 10,037,393 B1 | 7/2018 | Polovick et al. | |
| 10,063,406 B2* | 8/2018 | Tapia | G06N 20/00 |
| 10,097,576 B2 | 10/2018 | Jevans et al. | |
| 10,248,657 B2* | 4/2019 | Prahlad | G06F 16/1844 |
| 10,523,554 B2* | 12/2019 | Bugenhagen | H04Q 3/0062 |
| 10,534,819 B2* | 1/2020 | Ricci | H04L 63/102 |
| 10,554,508 B2 | 2/2020 | Boerner et al. | |
| 10,592,378 B1 | 3/2020 | Tali et al. | |
| 10,706,473 B2 | 7/2020 | Vaidyanathan et al. | |
| 10,979,875 B2* | 4/2021 | Dai | H04W 4/10 |
| 11,093,518 B1* | 8/2021 | Lu | G06F 11/3476 |
| 11,470,096 B2* | 10/2022 | Muddu | H04L 63/06 |
| 11,641,319 B2* | 5/2023 | Richards | H04L 43/14 709/224 |
| 11,770,311 B2* | 9/2023 | Bothe | H04L 43/04 709/224 |
| 2005/0091102 A1 | 4/2005 | Oleson et al. | |
| 2014/0039985 A1 | 2/2014 | Oleson et al. | |
| 2014/0082047 A1 | 3/2014 | Krannich | |
| 2014/0201714 A1 | 7/2014 | Vaidyan et al. | |
| 2014/0380413 A1 | 12/2014 | Archer et al. | |
| 2015/0154867 A1 | 6/2015 | Tseng et al. | |
| 2017/0161281 A1 | 6/2017 | Bhartia et al. | |
| 2017/0178045 A1 | 6/2017 | Wasik et al. | |
| 2017/0264749 A1 | 9/2017 | Wu et al. | |
| 2017/0353482 A1 | 12/2017 | Sommer | |
| 2018/0121657 A1 | 5/2018 | Hay et al. | |
| 2018/0359277 A1 | 12/2018 | Jevans et al. | |
| 2019/0036828 A1 | 1/2019 | Bajaj | |
| 2019/0114570 A1 | 4/2019 | Prasad | |
| 2019/0325307 A1 | 10/2019 | Li et al. | |
| 2020/0065736 A1 | 2/2020 | Relangi | |
| 2020/0151080 A1 | 5/2020 | Adler et al. | |
| 2020/0242000 A1 | 7/2020 | Khosrowpour et al. | |
| 2020/0304381 A1 | 9/2020 | Wang et al. | |
| 2021/0004913 A1 | 1/2021 | Eder | |
| 2021/0019247 A1 | 1/2021 | Hurley et al. | |
| 2021/0064401 A1 | 3/2021 | Vichare et al. | |
| 2021/0119890 A1* | 4/2021 | Richards | H04L 12/4633 |
| 2021/0319402 A1 | 10/2021 | Ramaswamy et al. | |

* cited by examiner

100

AUTOMATIC AND DYNAMIC PERFORMANCE BENCHMARKING AND SCORING OF APPLICATIONS BASED ON CROWDSOURCED TRAFFIC DATA

BACKGROUND

Aspects of the present disclosure generally relate to benchmarking applications to determine whether they are performing to an acceptable level, and more specifically, to techniques for automatic and dynamic performance benchmarking and scoring of one or more applications used by one customer based on crowdsourced traffic data collected from multiple customers.

In today's enterprise environment, customers tend to use a wide range of applications across one or more sites in their networks. These applications can include many different types such as but not limited to word processing and spreadsheet applications (e.g., Microsoft Office 365), customer relationship management (CRM) applications (e.g., Salesforce), video streaming applications (e.g., Netflix), and video sharing applications (e.g., YouTube).

It is important to determine if the performance of these applications is acceptable, otherwise remedial actions may need to be taken depending on whether the issue causing performance degradation is at the user level, the application level, the site level, or the network level, for example.

Currently, benchmarking and calibrating applications in order to characterize their real-time performance tends to be done at the time of installation or initialization, and using performance thresholds that remain fixed. This type of baselining is very limited and is unable to adjust as conditions in which the application operates change, or as the application itself changes (e.g., updates or newer versions). Accordingly, it is also desirable to implement techniques that simply and efficiently improve the ability of a customer to benchmark or baseline an application over time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, a system for automatic and dynamic performance benchmarking and scoring of applications (e.g., word processing application, video streaming application) is described having an intelligence layer communicatively coupled to a data collection layer and a visualization layer, the intelligence layer is configured to receive traffic data from data sources (e.g., probes in the network) in the data collection layer, the data sources are associated with multiple customers, and the traffic data is associated with at least one application used by the multiple customers. The intelligence layer is further configured to process the traffic data to determine performance thresholds for the at least one application, and to send one or more of the performance thresholds to a data source for a different customer to be used for benchmarking the at least one application for the different customer.

In connection with the system, the data source for the different customer may be configured to benchmark or baseline the at least one application using the one or more performance thresholds sent by the intelligence layer to produce an index value (e.g., experience score), where the visualization layer is configured to generate a graphical representation of the index value for display to a user associated with the different customer. The index value may range from 0 to N, N being an integer number (e.g., N=100), and where the at least one application has a better performance as benchmarked against the one or more performance thresholds when the index value is closer to N than when it is closer to 0.

In another aspect of the disclosure, a method for automatic and dynamic performance benchmarking and scoring of applications is described that includes receiving, at an intelligence layer communicatively coupled to a data collection layer and a visualization layer, traffic data from data sources in the data collection layer, the data sources being associated with multiple customers, and the traffic data being associated with at least one application used by the multiple customers. The method further includes processing the traffic data to determine performance thresholds for the at least one application, and sending one or more of the performance thresholds to a data source for a different customer to be used for benchmarking the at least one application for the different customer.

In connection with the method, benchmarking the at least one application using the one or more performance thresholds sent by the intelligence layer includes producing an index value, where the method further includes having the visualization layer generate a graphical representation of the index value for display to a user associated with the different customer. The index value may range from 0 to N, N being an integer number (e.g., N=100), and where the at least one application has a better performance as benchmarked against the one or more performance thresholds when the index value is closer to N than when it is closer to 0.

In another aspect of the disclosure, a computer-readable medium having code executable by a processor for automatic and dynamic performance benchmarking and scoring of applications is described that includes code for receiving, at an intelligence layer communicatively coupled to a data collection layer and a visualization layer, traffic data from data sources in the data collection layer, the data sources being associated with multiple customers, and the traffic data being associated with at least one application used by the multiple customers. The computer-readable medium further includes code for processing the traffic data to determine performance thresholds for the at least one application, and code for sending one or more of the performance thresholds to a data source for a different customer to be used for benchmarking the at least one application for the different customer.

The system, method, and computer-readable medium described herein allow for automatic adjustments in performance thresholds over time by using crowdsourced traffic data to enable the dynamic benchmarking of applications. This is in contrast with more traditional techniques that rely on an initial benchmarking and calibration of applications that remain fixed over time.

BRIEF DESCRIPTION OF THE DRAWINGS

The appended drawings illustrate only some implementation and are therefore not to be considered limiting of scope.

DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Tools may be used to characterize network performance issues and issues related to the internal performance of applications, but tools are needed to help bridge the gap between a network and applications. The present application provides a platform (see e.g., FIGS. 2A and 2B) that allows for the management of performance aspects that fall outside the scope of the network performance management tools and the applications performance management tools but that are of great interest to customers. Within this platform, it is possible to implement techniques that simply and efficiently improve the ability of a customer to benchmark or baseline an application over time by using traffic data collected from other customers (e.g., crowdsourced traffic data) in order to determine more applicable performance thresholds to use for the benchmarking or baselining. As used herein, the term benchmarking may refer to the setting of a baseline or guideline from which the performance of an application can be characterized, while the term scoring may refer to a numerical representation (e.g., an index value) of a comparison between a current performance of an application and its benchmark or baseline.

Figure 1:
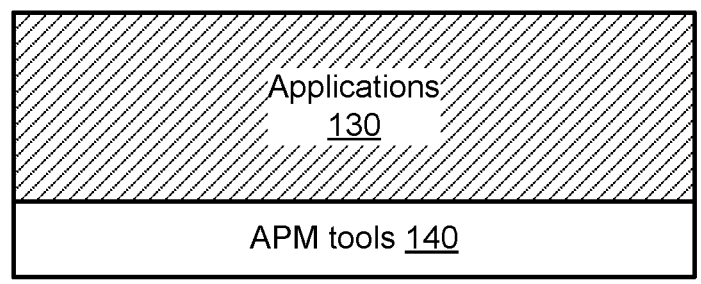
FIG. 1 illustrates an example of network and applications performance management tools, in accordance with aspects of this disclosure.
Figure 1:
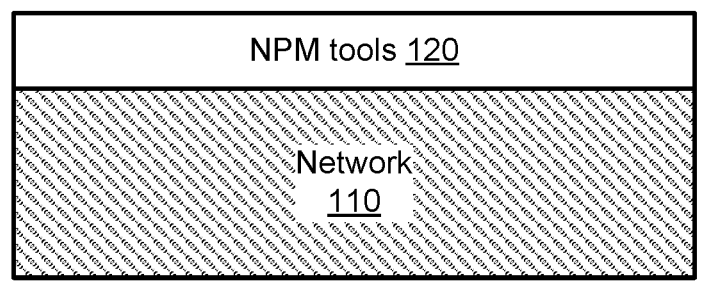

FIG. 1 illustrates a diagram 100 that shows an example of network and applications performance management tools, in accordance with aspects of this disclosure. In this example, a stack representative of a customer's environment is described having a network 110 at the bottom followed by network performance management (NPM) tools 120 sitting over the network 110. At the top of the stack are application performance management (APM) tools 140 and sitting on top of the APM tools 140 are applications 130. The NPM tools 120 include software to manage or characterize the performance of the network 110, while the APM tools 140 include software that operates with the applications 130 to characterize how the applications 130 are performing internally.

The applications 130 may include one or more applications. Non-limiting examples of applications include a word processing application (e.g., Microsoft Office 365), a spreadsheet application (e.g., Microsoft Office 365), a database application (e.g., Oracle), a video streaming application (e.g., Netflix), a video sharing application (e.g., YouTube), a web browsing application (e.g., Chrome), a design application, a collaborative application, a customer relationship management (CRM) application (e.g., Salesforce), or any combination thereof.

A blind spot (e.g., a user experience gap) exists between the network 110/the NPM tools 120 and the APM tools 140/the applications 130. It may be desirable to look at the performance of applications 130 outside the scope of what the NPM tools 120 can do on the network 110 and what the APM tools 140 can do within the applications 130 for a particular customer. One way to do so is to look at the traffic data (e.g., data packets) associated with the applications 130 to determine, for example, which users are doing what, how much of each application 130 is being used, how many of the applications 130 are being used across the business, and the like. That is, by tracking those performance aspects associated with the applications 130 that are not characterized or monitored by the NPM tools 120 and/or the APM tools 140 it is possible for a customer to get additional insight into the performance of the applications 130. For example, the NPM tools 120 and/or the APM tools 140 may be used to determine how much a particular application 130 is being used, but they may not be able to characterize whether the performance associated with such usage is positive or negative. Additional techniques may be needed not only to determine whether a particular application 130 is operating slowly (e.g., its response time performance is below a certain performance threshold), but may also be able to identify why it is slower than the performance threshold. With this information, a customer can be notified that potential issues exist before a user reports the issue. It is then possible for the customer to determine if the performance degradation is the result of, for example, the network, the application, or the cloud (if a cloud-based application is being provided). By providing such detection and notification assistance, the customer can then have the appropriate person or team, whether it is the network manager, the application manager, or the cloud manager, figure out what is needed to correct for the less than ideal performance. More details regarding the implementation of techniques and/or tools for managing application performance aspects other than those obtained from, for example, the NPM tools 120 and/or the APM tools 140, are provided below in connection with FIGS. 2A and 2B.

Figure 2A:
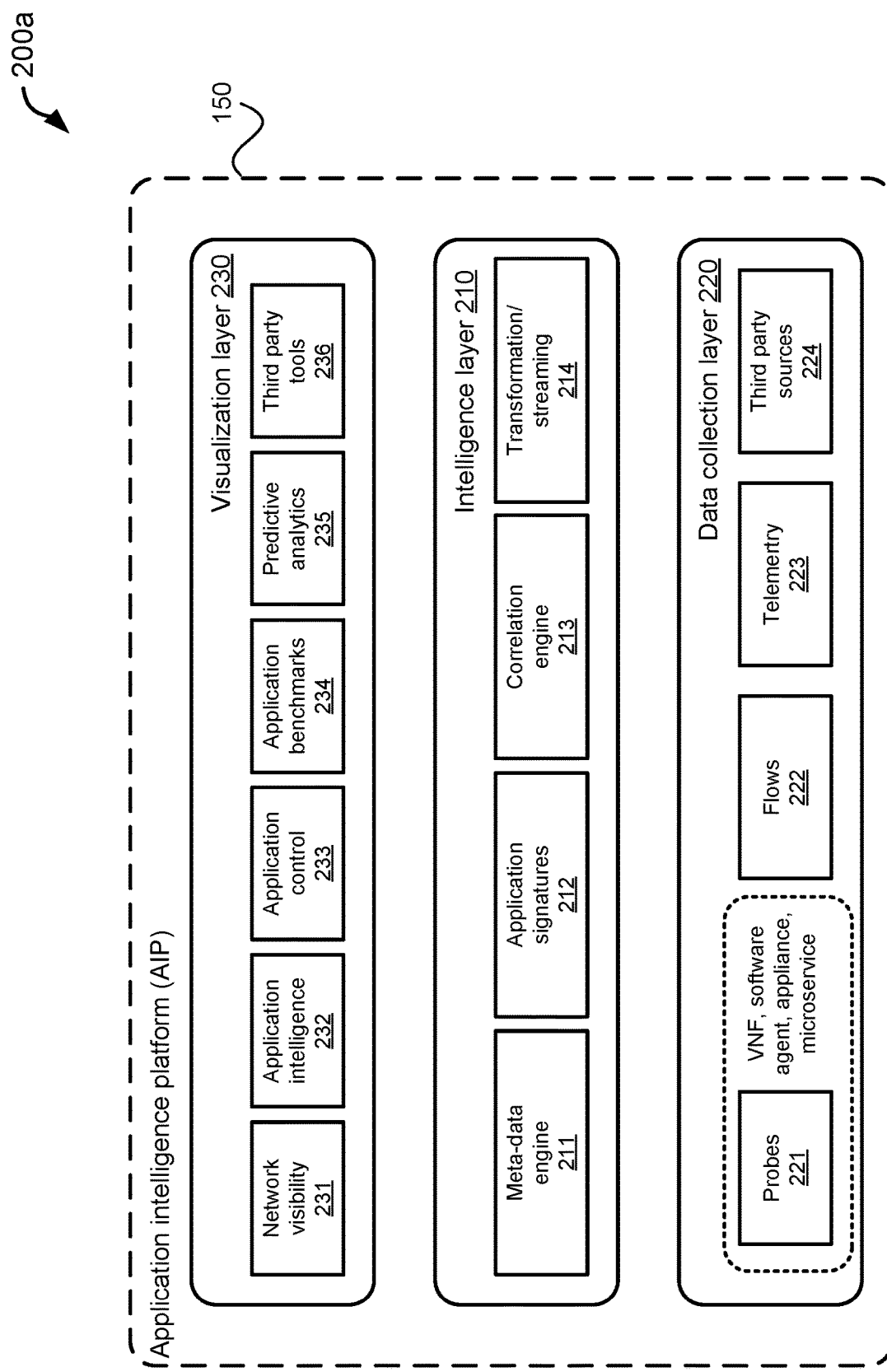
FIG. 2A illustrates an example of an application intelligence platform that bridges the intelligence gap, in accordance with aspects of this disclosure.

FIG. 2A illustrates a diagram 200a that shows an example of application intelligence platform (AIP) 150, in accordance with aspects of this disclosure. The AIP 150 includes a cloud-based intelligence layer 210 that is communicatively coupled to a data collection layer 220 and a visualization layer 230. In some cases, the visualization layer 230, or at least portions of it, may also be cloud-based. Some parts of the data collection layer 220 may be cloud-based, although in some examples parts of the data collection layer 220 are not implemented in a cloud.

The data collection layer 220 includes probes 221, which are boxes (e.g., physical or virtual boxes) that are used to collect packets in a wire (e.g., traffic data). A customer would deploy one or more probes 221 in their network to collect the appropriate information. The concept of the probes 221 may be extended to include virtual network function (VNF), software agents, physical appliances, microservices, and the like. The data collection layer 220 may also include flows 222, telemetry 223, and/or third party sources 224. All these, along with the probes 221, constitute different types of data sources that may be used in the data collection layer 220 to collect packet information.

The information collected by the data collection layer 220 is sent to the intelligence layer 210 where the information is processed by one or more components. For example, the intelligence layer 210 may include a meta-data engine 211, an application signatures component 212, a correlation engine 213, and/or a transformation/streaming component 214. The intelligence layer 210 may include other components (not shown) to perform additional functions and/or may use some of the components shown to perform the additional functions.

The visualization layer 230 includes tools and other components to help a customer, or user associated with the customer, to visualize, represent, or report information regarding the performance of applications being tracked or managed by the AIP 150. In this non-limiting example, the visualization layer 230 may include a network visibility component 231, an application intelligence component 232, an application control component 233, an application benchmarks component 234, and/or third party tools 236. Optionally, the visualization layer 230 may include a predictive analytics component 235, which in some cases may be provided or supported by a third party.

In general, the probes 221 (or any other data source) collect traffic data associated with one or more applications (e.g., the applications 130) from a customer's network, the traffic data is then sent to the intelligence layer 210 for storage and processing, including performing correlation operations and/or machine learning (ML) operations, and at least some of the information generated by the intelligence layer 210 and/or the traffic data collected by the data collection layer 220 may be displayed in a user interface (UI) to indicate the performance of the one or more applications to the customer so that if the performance is poor in any or all of the applications the customer may take remedial actions.

Figure 2B:
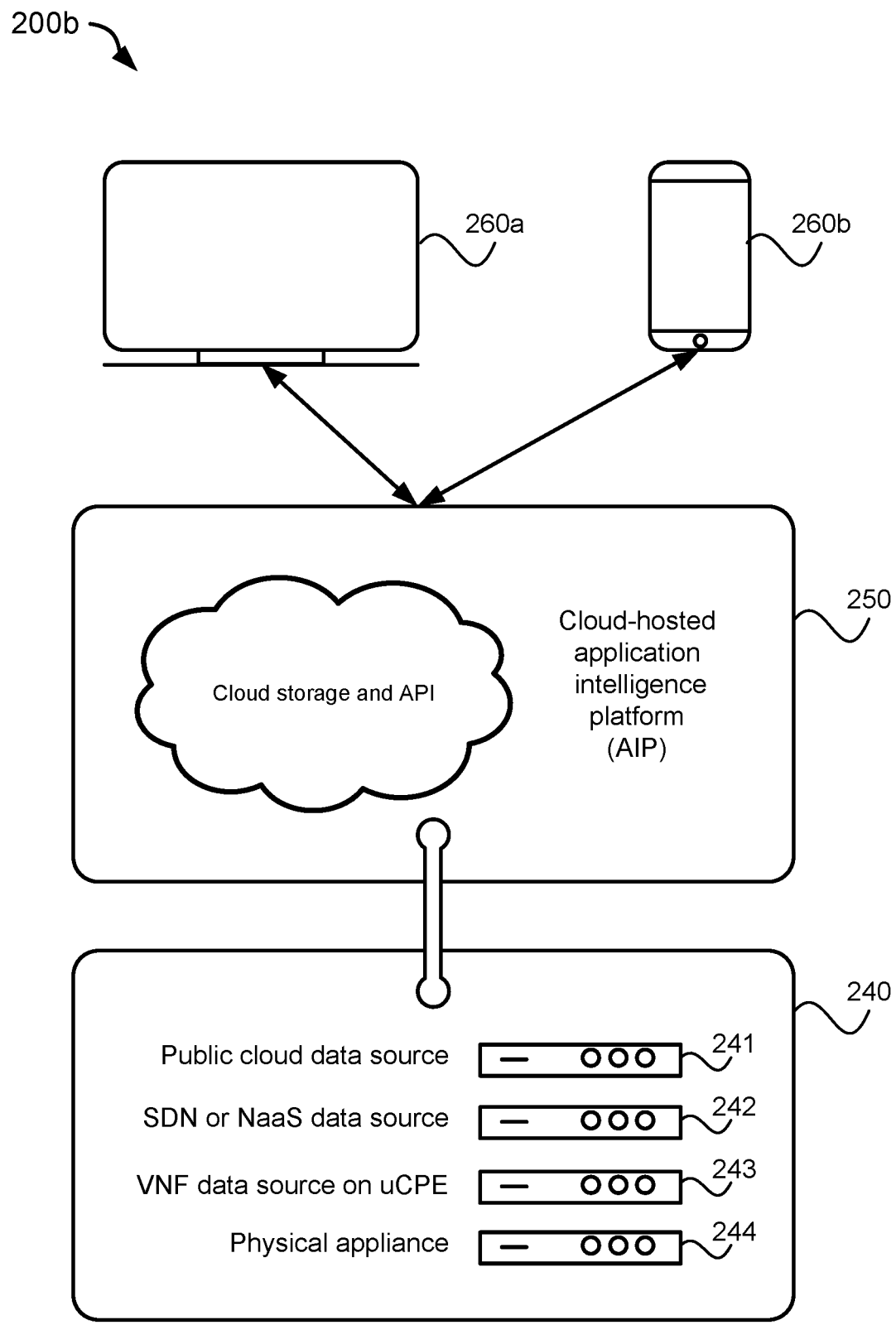
FIG. 2B illustrates another example of the application intelligence platform, in accordance with aspects of this disclosure.

FIG. 2B illustrates a diagram 200b that shows another representation of the layers described above in connection with the API 150 in FIG. 2A, in accordance with aspects of this disclosure. As mentioned above, the API 150 may include the intelligence layer 210, the data collection layer 220, and the visualization layer 230. The intelligence layer 210 and at least portion of the visualization layer 230 may be implemented in a cloud-hosted solution 250 that provides both cloud storage and application programming interfaces (APIs).

Data sources 240 in FIG. 2B may be examples of the data sources used in the data collection layer 220, which may or may not be implemented in a cloud. The data sources 240 may include, but need not be limited to, a public cloud data source 241, a software-defined network (SDN) or network as a service (NaaS) data source 242, a VNF data source on universal customer premises equipment (uCPE) 243, a virtual appliance, and/or a physical appliance (e.g., physical box) 244.

Information (e.g., graphical information) provided by or through the visualization layer 230 may be displayed on UIs in different types of devices including desktops or laptops 260a and/or in mobile devices 260b through mobile applications (e.g., iOS- or Android-based apps).

As mentioned above, the benchmarking and calibration of applications to characterize their real-time performance may be done at the time of installation or initialization, and using performance thresholds that remain fixed. This type of baselining is very limited and is unable to adjust as conditions in which the application operates change, or as the application itself changes (e.g., updates or newer versions). With the API 150 described above, it is possible to collect information from many customers (e.g., crowdsourcing) that use the same application(s) and then use this information to provide better performance thresholds or baselines over time, thereby allowing for a simple and efficient way improve the ability of a customer to benchmark an application over time. In other words, the API 150 allows for information to be collected for a particular application from multiple customers to then provide updated or adjusted performance thresholds for that application to allow better benchmarking of that application over time. This approach can be segmented, for example, by having customers in certain geographic regions and/or industries have their performance thresholds updated with information from other customers in the same geographic regions and/or industries.

In this regard, the present disclosure describes a system (e.g., the API 150) for automatic and dynamic benchmarking of applications. The system includes an intelligence layer (e.g., the intelligence layer 210) communicatively coupled to a data collection layer (e.g., the data collection layer 220) and a visualization layer (e.g., the visualization layer 230). The intelligence layer is configured to receive traffic data from data sources (e.g., the probes 221, the data sources 240) in the data collection layer, where the data sources are associated with multiple customers, where the traffic data is associated with at least one application (e.g., the applications 130) used by the multiple customers. The intelligence layer is further configured to process the traffic data to determine performance thresholds (e.g., time response thresholds) for the at least one application, and to send one or more of the performance thresholds to a data source for a different customer to be used for benchmarking the at least one application for the different customer. It may be the case that the different customer is part of the multiple customers such that its own traffic data is used to determine the performance thresholds. The performance thresholds may indicate a minimum acceptable value of a performance metric associated with the at least one application. The performance thresholds may be based on different types of segments, such as geographic segments and/or industry segments, where the customer may be able to select which type of performance threshold segment is preferable to use when benchmarking its applications.

The system may be described as a platform that includes the intelligence layer and at least one of the data collection layer and the visualization layer, where the intelligence layer is a cloud-based layer (see e.g., FIG. 2B).

In this system, one or more of the data sources are connected to a network associated with a respective one of the multiple customers, and the one or more data sources collect traffic data for the respective customer and send the collected traffic data to the intelligence layer.

In this system, the at least one application may include two or more applications, the performance thresholds that are determined may therefore include one or more performance thresholds for each of the two or more applications.

In this system, the intelligence layer (e.g., one of its components) may be configured to periodically query the data traffic received from the data sources to determine information associated with the performance of the at least one application, and the information determined from the traffic data may be used to determine the performance thresholds for the at least one application. The intelligence layer may be further configured to receive instructions (e.g., from a customer or user associated with the customer) identifying which performance thresholds to determine by processing the traffic data. For example, a customer may prefer to benchmark its applications to customers in similar industries and may therefore provide such instructions to the intelligence layer (e.g., via the visualization layer 230) such that the performance thresholds determined by the intelligence layer are consistent with the customer's preferred segment.

In this system, the data source for the different customer is configured to benchmark the at least one application using the one or more performance thresholds sent by the intelligence layer to produce an index value indicative of how well the application is performing in relation to the performance thresholds. The visualization layer may be configured to generate a graphical representation of the index value for display to a user associated with the different customer. In a non-limiting example, the index value may range from 0 to N, N being an integer number, and the at least one application is considered to have a better performance as benchmarked against the one or more performance thresholds when the index value is closer to N than when it is closer to 0. For example, if a word processing application has a response time of 2 seconds and the performance threshold in a related segment (e.g., geographic segment and/or industry segment) is 5 seconds, then the index value produced for that application may be high to indicate a good performance. But if instead the performance threshold for the related segment is 1 second, then the index value produced for that application may be low to indicate a poor or fair performance.

Figure 3:
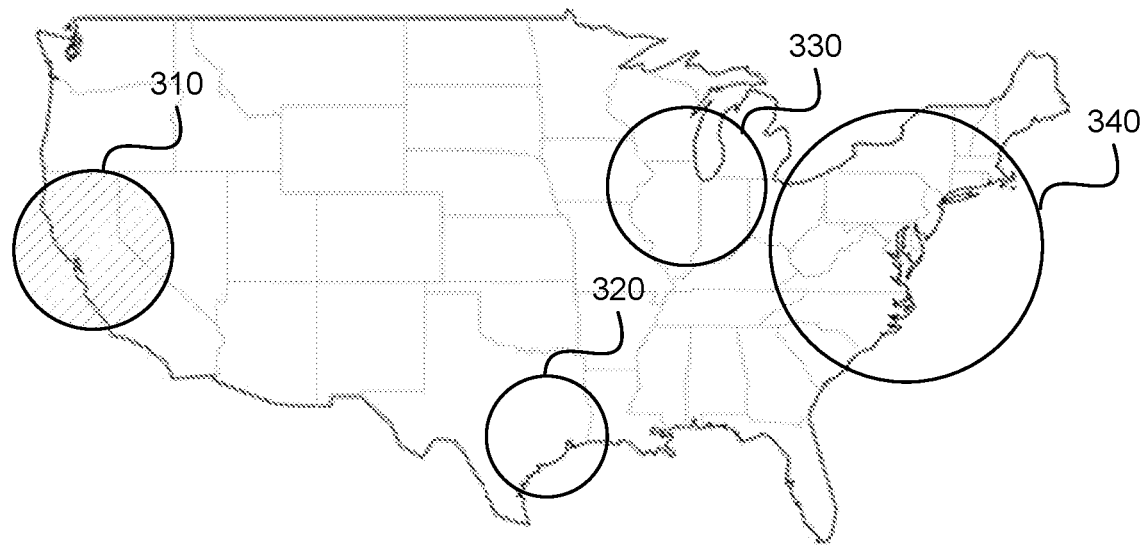
FIG. 3 illustrates an example visualization of an index value produced by the dynamic benchmarking enabled by the application intelligence platform, in accordance with aspects of this disclosure.

FIG. 3 illustrates a diagram 300 that shows an example visualization of the index value produced by the dynamic benchmarking described above, in accordance with aspects of this disclosure. In this example, various circles are shown on a map to characterize the performance of a particular application (e.g., one of the applications 130) for one customer, where each circle may represent a different site of the customer's business network, a size of the circle may represent a number of users on that site, and a color or shading of the circle may indicate whether its performance is good or bad according to the corresponding index value determined as described above. In other words, the circles may be used as graphical representations of the performance of that particular application in different customer sites.

In this example, the customer's business network includes four sites, a first site 310 (San Francisco), a second site 320 (Houston), a third site 330 (Chicago), and a fourth site 340 (New York City). The fourth site 340 has the largest number of users, but like the second site 320 and the third site 330, their circles are clear indicating that the particular application being characterized is performing well in those sites (e.g., the index value for that application in each of those sites if fairly high). For the first site 310, however, the corresponding circle is shown with hatched lines to indicate that the particular application being characterized is not performing well in that site and remedial action may be needed.

It is to be understood that the example in FIG. 3 is provided by way of illustration and not of limitation, and there may be many different ways in which graphical representations may be used to indicate the performance of a particular application based on an index value produced based on the performance of the application relative to a respective performance threshold.

Figure 4:
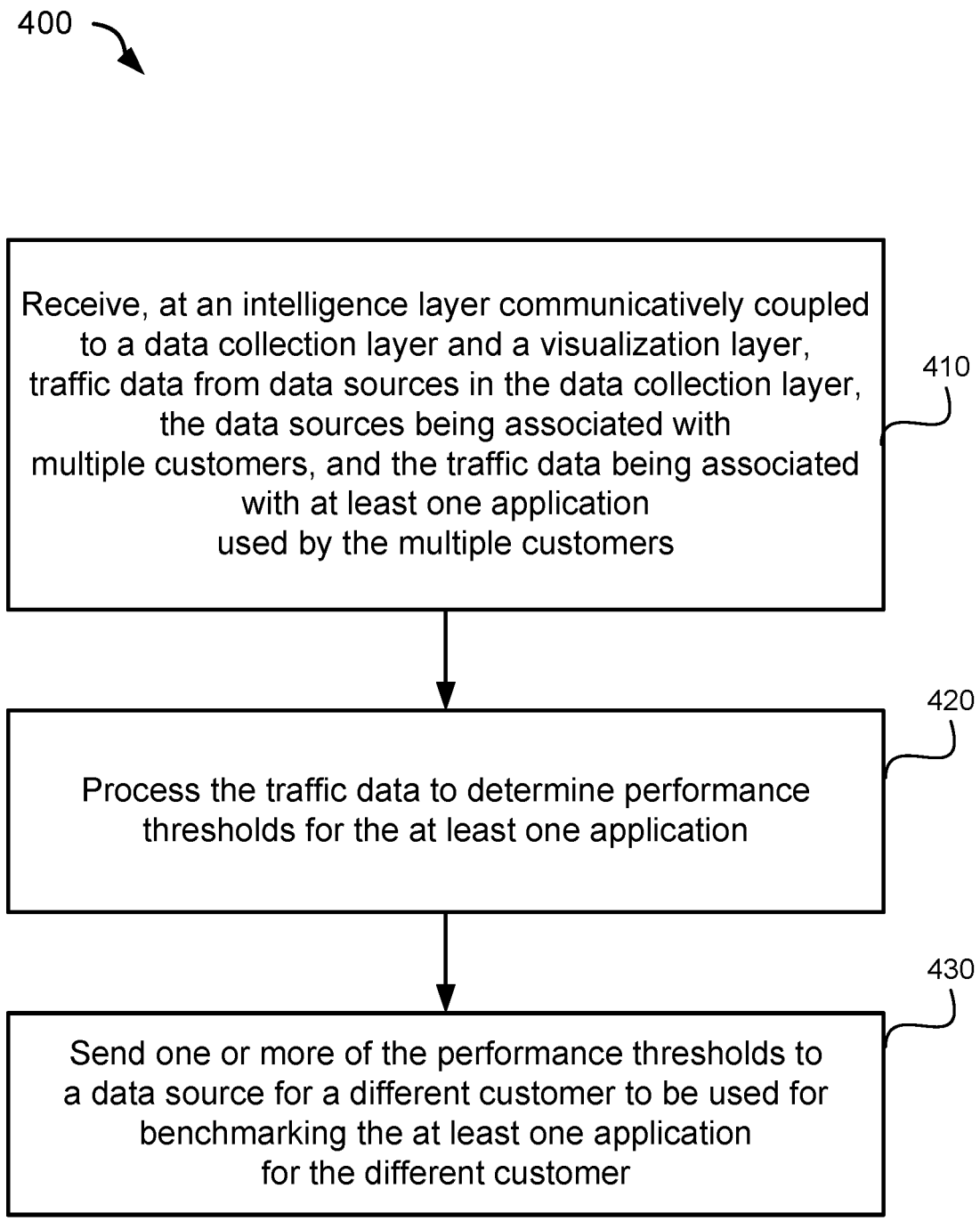
FIG. 4 illustrates an example of a flow diagram describing a method for automatic and dynamic benchmarking of applications, in accordance with aspects of this disclosure.

FIG. 4 illustrates an example of a flow diagram describing a method 400 for automatic and dynamic benchmarking of applications, in accordance with aspects of this disclosure. Aspects of the method 400 may be performed by one or more processors using one or more memories, whether these are available in cloud-based environment, local to a customer's premises, and/or remotely at a service providers' facilities or resources. The memory and the one or more processors may be configured to perform the aspects of the method 400 in FIG. 4, as well as additional aspects described herein.

At 410, the method 400 includes receiving, at an intelligence layer (e.g., the intelligence layer 210) communicatively coupled to a data collection layer (e.g., the data collection layer 220) and a visualization layer (e.g., the visualization layer 230), traffic data from data sources in the data collection layer. The data sources (e.g., the probes 221, the data sources 240) are associated with multiple customers, and the traffic data is associated with at least one application (e.g., the applications 130) used by the multiple customers. The intelligence layer and at least one of the data collection layer and the visualization layer may be part of a platform such as the API 150 described above.

At 420, the method 400 includes processing the traffic data to determine performance thresholds (e.g., time response thresholds) for the at least one application.

At 430, the method 400 includes sending one or more of the performance thresholds to a data source for a different customer to be used for benchmarking the at least one application for the different customer. It may be the case that the different customer is part of the multiple customers such that its own traffic data is used to determine the performance thresholds. The performance thresholds may indicate a minimum acceptable value of a performance metric associated with the at least one application. The performance thresholds may be based on different types of segments, such as geographic segments and/or industry segments, where the customer may be able to select which type of performance threshold segment is preferable to use when benchmarking its applications.

In an aspect of the method 400, one or more of the data sources are connected to a network associated with a respective one of the multiple customers, the method 400 further includes having the one or more data sources collect traffic data for the respective customer and send the collected traffic data to the intelligence layer.

In another aspect of the method 400, the at least one application includes two or more applications, and the performance thresholds may therefore include one or more performance thresholds for each of the two or more applications.

In another aspect of the method 400, benchmarking the at least one application using the one or more performance thresholds sent by the intelligence layer includes producing an index value (also referred to scoring), the method 400 further includes having the visualization layer generate a graphical representation of the index value for display to a user associated with the different customer (see e.g., FIG. 3). In an example, the index value ranges from 0 to N, N being an integer number (e.g., N=100), and the at least one application has a better performance as benchmarked against the one or more performance thresholds when the index value is closer to N than when it is closer to 0.

In another aspect of the method 400, processing the traffic data includes periodically querying the data traffic received from the data sources to determine information associated with the performance of the at least one application, and the information determined from the traffic data is then used to determine the performance thresholds for the at least one application.

In yet another aspect of the method 400, the method 400 may further include receiving at the intelligence layer instructions identifying which performance thresholds to determine by processing the traffic data.

In addition to the system and method described above, the present disclosure also describes a computer-readable medium having code executable by a processor for automatic and dynamic benchmarking of applications, where the computer-readable medium includes code for receiving, at an intelligence layer (e.g., the intelligence layer 210) communicatively coupled to a data collection layer (e.g., the data collection layer 220) and a visualization layer (e.g., the visualization layer 230), traffic data from data sources in the data collection layer, the data sources (e.g., the probes 221, the data sources 240) being associated with multiple customers, and the traffic data being associated with at least one application (e.g., the applications 130) used by the multiple customers. The computer-readable medium may further include code for processing the traffic data to determine performance thresholds for the at least one application, and code for sending one or more of the performance thresholds to a data source for a different customer to be used for benchmarking the at least one application for the different customer. The same or similar features described above in connection with the system and method are applicable to the computer-readable medium.

Aspects of the methods and systems described herein may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 5:
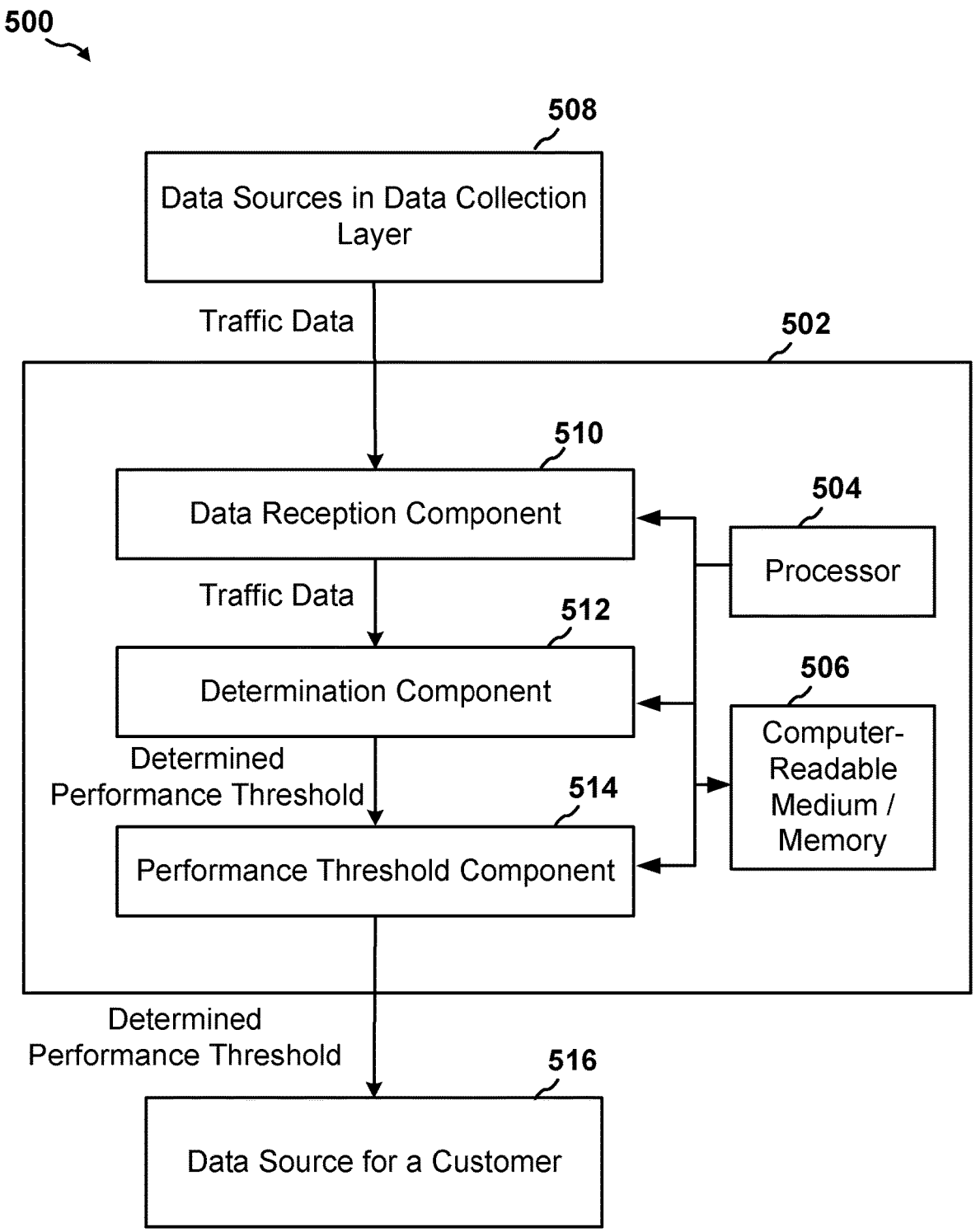
FIG. 5 illustrates and example system configured to perform a method for automatic and dynamic benchmarking of applications, in accordance with aspects of this disclosure.

For example, FIG. 5 illustrates an example system 500 that may be configured to perform the aspects of method 400 in FIG. 4. The system may include memory 506 and at least one processor 504 configured to perform the aspects described in connection with FIG. 4. For example, an intelligence layer 502 may include a data reception component 510 configured to receive traffic data from data sources in the data collection layer 508 (e.g., as described in connection with 402 in FIG. 4); a determination component 512 configured to process the data traffic to determine performance thresholds for at least one application (e.g., as described in connection with 404 in FIG. 4); and a performance threshold component 514 configured to send one or more of the performance thresholds to a data source for a different customer 516 (e.g., as described in connection with 406 in FIG. 4).

Although the present disclosure has been provided in accordance with the implementations shown, one of ordinary skill in the art will readily recognize that there could be variations to the implementations and those variations would be within the scope of the present disclosure. Accordingly, many modifications may be made by one of ordinary skill in the art without departing from the scope of the appended claims.

The invention claimed is:

1. A method comprising:
collecting over time, from networks of a plurality of customers, traffic data associated with a set of one or more applications used by the plurality of customers;
determining performance thresholds for the set of applications based on the collected traffic data and periodically updating the performance thresholds based on collecting the traffic data over time; and
based on a request from a first customer to benchmark performance of a first of the set of applications, providing updated performance thresholds of the first application to the first customer and benchmarking performance of the first application for the first customer with respect to the updated performance thresholds.

2. The method of claim 1, wherein the updated performance thresholds account for at least one of application changes and conditions in which an application operates.

3. The method of claim 1, wherein collecting the traffic data comprises collecting the traffic data from probes deployed at data sources of the plurality of customers.

4. The method of claim 3, wherein the data sources comprise at least one of a public cloud data source, a software-defined network (SDN) data source, network as a service (NaaS) data source, a virtual network function (VNF) data source on universal customer premises equipment (uCPE), a VNF data source on a virtual appliance, and a physical appliance data source.

5. The method of claim 3, wherein a probe comprises at least one of a virtual network function (VNF), a software agent, a physical appliance, and a microservice.

6. The method of claim 1, wherein benchmarking performance of the first application for the first customer comprises determining an index value indicative of performance of the first application for the first customer relative to the performance thresholds.

7. The method of claim 1, wherein benchmarking performance of the first application for the first customer comprises benchmarking performance of the first application at each of multiple sites of the first customer with respect to the updated performance thresholds.

8. The method of claim 1, further comprising segmenting the traffic data, wherein providing updated performance thresholds of the first application comprises determining a segment of the first customer and providing updated performance thresholds based on collected traffic data of those of the plurality of customers in the same segment.

9. The method of claim 1, wherein the plurality of customers includes the first customer.

10. A non-transitory, machine-readable medium having program code stored thereon, the program code comprising instructions to:
- collect over time, from networks of a plurality of customers, traffic data associated with a set of one or more applications used by the plurality of customers;
- determine performance thresholds for the set of applications based on the collected traffic data and periodically update the performance thresholds based on collecting the traffic data over time; and
- based on a request from a first customer to benchmark performance of a first of the set of applications, provide updated performance thresholds of the first application to the first customer and benchmark performance of the first application for the first customer with respect to the updated performance thresholds.

11. The non-transitory, machine-readable medium of claim 10, wherein the updated performance thresholds account for at least one of application changes and conditions in which an application operates.

12. The non-transitory, machine-readable medium of claim 10, wherein the instructions to collect the traffic data comprise instructions to collect the traffic data from probes deployed at data sources of the plurality of customers.

13. The non-transitory, machine-readable medium of claim 12,
- wherein the data sources comprise at least one of a public cloud data source, a software-defined network (SDN) data source, network as a service (NaaS) data source, a virtual network function (VNF) data source on universal customer premises equipment (uCPE), a VNF data source on a virtual appliance, and a physical appliance data source, and
- wherein a probe comprises at least one of a virtual network function (VNF), a software agent, a physical appliance, and a microservice.

14. The non-transitory, machine-readable medium of claim 10, wherein the instructions to benchmark performance of the first application for the first customer comprise instructions to determine an index value indicative of performance of the first application for the first customer relative to the performance thresholds.

15. The non-transitory, machine-readable medium of claim 10, wherein the instructions to benchmark performance of the first application for the first customer comprise instructions to benchmark performance of the first application at each of multiple sites of the first customer with respect to the updated performance thresholds.

16. The non-transitory, machine-readable medium of claim 10, wherein the program code further comprises instructions to segment the traffic data, wherein the instructions to provide updated performance thresholds of the first application comprise instructions to determine a segment of the first customer and provide updated performance thresholds based on collected traffic data of those of the plurality of customers in the same segment.

17. The non-transitory, machine-readable medium of claim 10, wherein the plurality of customers includes the first customer.

18. An apparatus comprising:
- a processor; and
- a machine-readable medium having instructions stored thereon that are executable by the processor to cause the apparatus to,
- collect over time, from networks of a plurality of customers, traffic data associated with a set of one or more applications used by the plurality of customers;
- determine performance thresholds for the set of applications based on the collected traffic data and periodically update the performance thresholds based on collecting the traffic data over time; and
- based on a request from a first customer to benchmark performance of a first of the set of applications, provide updated performance thresholds of the first application to the first customer and benchmark performance of the first application for the first customer with respect to the updated performance thresholds.

19. The apparatus of claim 18, wherein the instructions to benchmark performance of the first application for the first customer comprise instructions executable by the processor to cause the apparatus to determine an index value indicative of performance of the first application for the first customer relative to the performance thresholds.

20. The apparatus of claim 18, wherein the instructions to wherein the instructions to benchmark performance of the first application for the first customer comprise instructions executable by the processor to cause the apparatus to benchmark performance of the first application at each of multiple sites of the first customer with respect to the updated performance thresholds.

* * * * *